(No Model.)

H. V. ARNOLD.
DEVICE FOR CONTROLLING LIGHT EFFECTS.

No. 577,816.

Patented Feb. 23, 1897.

WITNESSES:

INVENTOR
Harry V. Arnold
BY
ATTORNEYS.

(No Model.) 3 Sheets—Sheet 2.

H. V. ARNOLD.
DEVICE FOR CONTROLLING LIGHT EFFECTS.

No. 577,816. Patented Feb. 23, 1897.

WITNESSES:
Gustave Dieterich
George Morse

INVENTOR
Harry V. Arnold
BY Briesen & Knauth
ATTORNEYS.

(No Model.) 3 Sheets—Sheet 3.
H. V. ARNOLD.
DEVICE FOR CONTROLLING LIGHT EFFECTS.
No. 577,816. Patented Feb. 23, 1897.
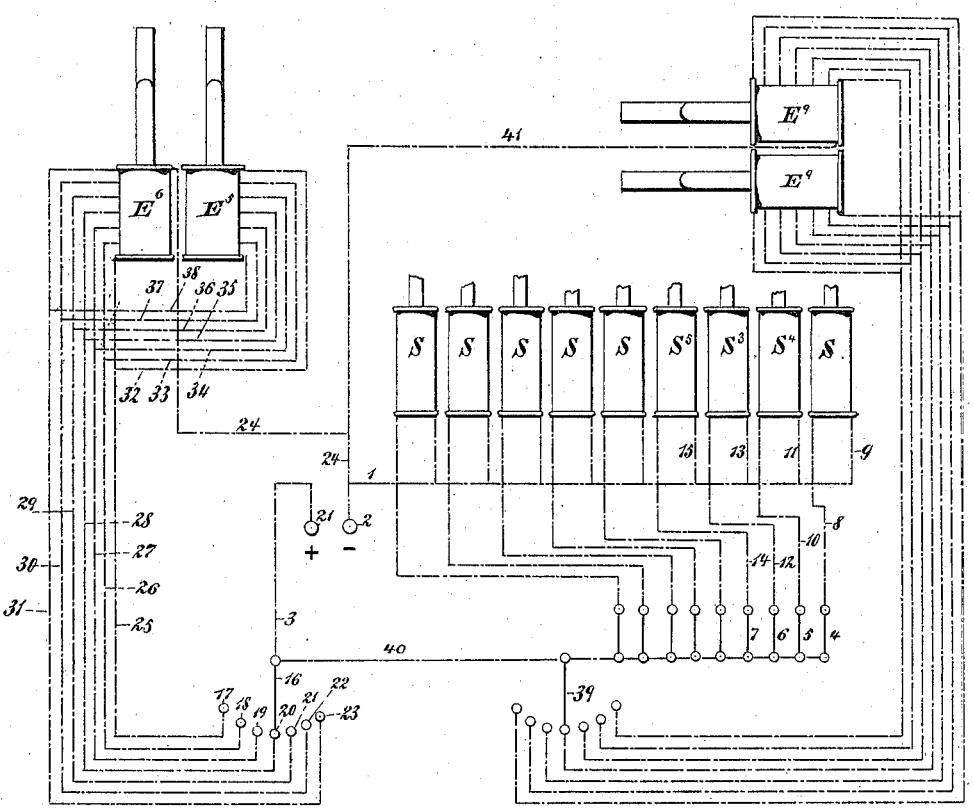
WITNESSES:
INVENTOR
Harry V. Arnold
BY
ATTORNEYS.

UNITED STATES PATENT OFFICE.

HARRY V. ARNOLD, OF NEW YORK, N. Y., ASSIGNOR TO SOLOMON MAY AND MOSES MAY, OF SAME PLACE.

DEVICE FOR CONTROLLING LIGHT EFFECTS.

SPECIFICATION forming part of Letters Patent No. 577,816, dated February 23, 1897.

Application filed February 24, 1896. Serial No. 580,409. (No model.)

*To all whom it may concern:*

Be it known that I, HARRY V. ARNOLD, a resident of the city, county, and State of New York, have invented a new and Improved Device for Controlling Light Effects, of which the following is a specification.

My invention relates to means for operating or controlling the different-colored media used in the so-called "light effects." That is to say, having observed the inconvenience occasioned by the system of throwing lights upon theatrical stages and analogous places and the inefficiency, danger, and expense of the same, I have devised means for more efficiently handling the transparent media used in making the light effects, which means would not be open to the various objections incident to existing devices. In order to make the matter more clear, I will state that it has been the custom in operas, &c., to use a powerful light in the auditorium and other parts of the theater to shine upon the stage, and to place from time to time before this light frames containing colored transparent material, so as to throw a colored light upon the stage. I would further remark that it is essential during certain scenes to change the color of the light at a given signal or cue. This is now done by removing the colored screen in front of the light and replacing it with another screen of the desired color. The present means for doing this are cumbersome and unsatisfactory in that it is unreliable.

My present invention is designed to obviate these defects.

My invention will be understood by reference to the accompanying drawings, in which—

Figure 1:
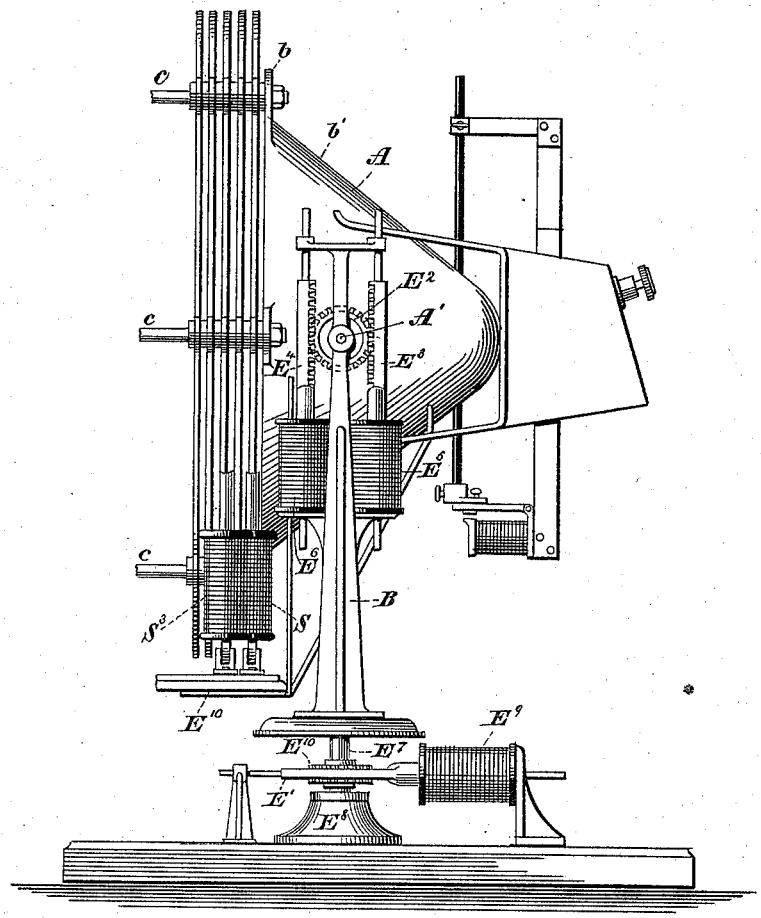
Figure 2:
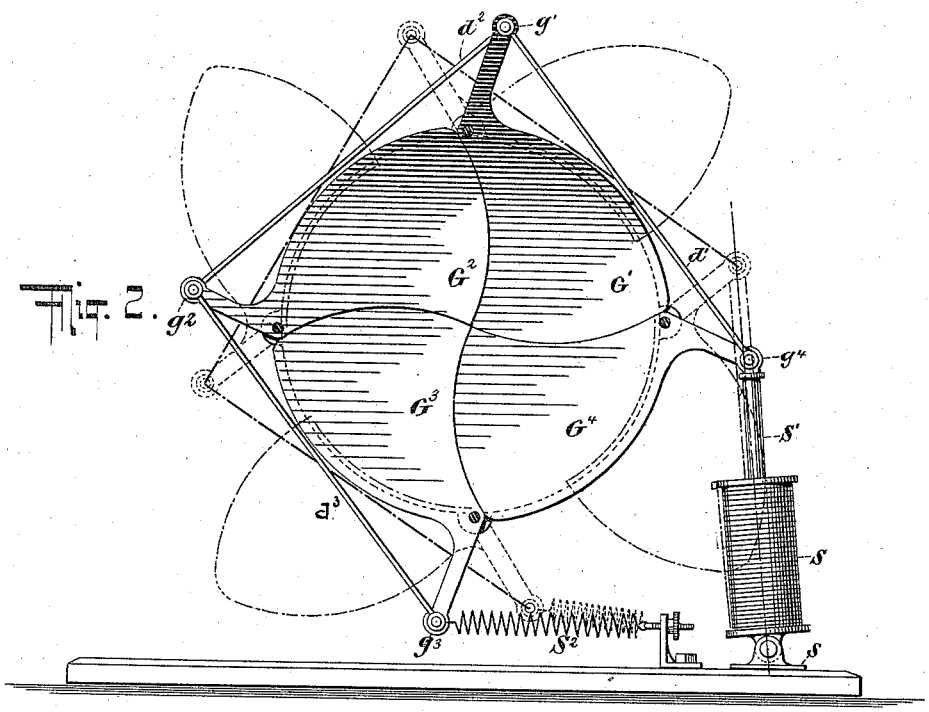
Figure 3:
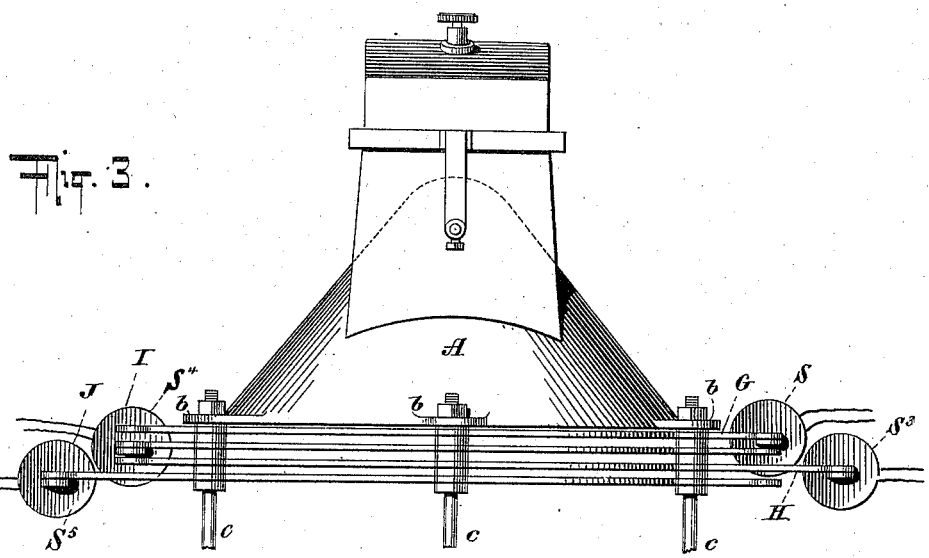

Figure 1 is a side view of an apparatus embodying my invention. Fig. 2 is a detail front view of one of the screens and its operating mechanism. Fig. 3 is a plan view of the lamp, showing only such parts as are necessary to clearly illustrate and describe the screen-operating device; and Fig. 4 is a diagrammatic view of the circuit.

In the drawings, A is a suitable projector, which is mounted upon a pivot A', hung in uprights B, only one of which is shown. (See Fig. 1.) The reflector supports a platform C, which carries the screen-operating magnets. Lugs $b$ on the reflector $b'$ of the projector carry studs $c$, which studs carry a series of composite screens G H I J, consisting of sections (shown in Fig. 2 as four in number) $G'$ $G^2$ $G^3$ $G^4$, each of which is carried by and pivoted on a lug $c$ and is provided with an outwardly-extending arm $g'$ $g^2$ $g^3$ $g^4$. These sections are preferably in the form of curvilinear triangles having two convex sides and one concave side, as shown, for a reason which will hereinafter be apparent. Similar mechanism is used for operating each of the screens.

I will now refer particularly to the mechanism operating one of the sections. This is shown in Fig. 2, and consists of a solenoid S, pivoted to a bracket $s$ on the platform C. Working in this solenoid is a core $S'$, which is shown as connected to the arm $g^4$ of the shutter-section $G^4$, which arm is connected to the arm $g'$ by a link $d'$, the arm $g'$ being connected to the arm $g^2$ by the link $d^2$, the arm $g^2$ being in turn connected to the arm $g^3$ by the link $d^3$. A suitable restoring-spring $S^2$ may be provided to restore the parts to their original positions. It will be apparent now that when the solenoid S is energized it will pull in its core $S'$, thereby moving the system of arms and rods and swinging the sections of the composite screen into position, thus interposing the desired colored medium and changing the color of the light. Upon breaking the solenoid-circuit the solenoid, being no longer energized, loses its power and the spring $S^2$ operates upon the sectional screen and the sections will be shifted to the position indicated by the dotted lines. The screen H is similar in construction and operated in a similar manner by the solenoid $S^3$, the screen I by the solenoid $S^4$, and the screen J by the solenoid $S^5$. The circuit connections for these solenoids are clearly shown in Fig. 4, wherein, for the purposes of illustration, I have shown ten solenoids for shifting screens, which may be colored or opaque, or for producing lightning effects and sundry other uses.

It will be observed that a wire 1 forms a common return from all of the solenoids to the negative pole 2 of the dynamo or terminals of the mains. From the positive pole 21 of the machine or circuit-terminals a wire 3 leads to one point of each of the switches 4 5 6 7, &c. From the switch 4 a wire 8 leads to the solenoid S, a wire 9 serving to connect the solenoid S with the common return 1. From the switch 5 a wire 10 extends to the solenoid $S^4$, a wire 11 forming the connection between the solenoid and the common return. In a similar manner wire 12 connects the solenoid $S^3$ with its switch 6, and wire 13 connects the solenoid with the common return. Solenoid $S^5$ is connected by the wire 14 with its switch 7 and by the wire 15 with the common return, so that by manipulating the switches 4 5 6 7 any solenoid may be energized and its screen thrown in front of the light.

Normally the circuits of the solenoids are open and the sections of the screens are in the positions indicated by dotted lines, being maintained there by the spring. When, however, it is desired to interpose one of the screens in the path of the beam of light, the switch controlling the solenoid which operates the particular set of sections desired is closed, to swing the screen-sections into their closed position, so that they will come into the path of the beam of light and make one continuous screen, as shown in Fig. 2. By properly manipulating switches the different screens may be thrown into action one after another, or any number together, which operations may be performed with great facility from a distance and with a certainty of operation.

I may also produce various other stage effects in the same manner, such, for instance, as so-called "stage-lightning."

It will be observed that by concaving one side of the triangular screen-sections a substantially circular orifice is the result when the screen-sections are swung into the positions shown in dotted lines.

Carried upon the pivot A' is a pinion $E^2$, which meshes with two racks $E^3$ $E^4$, which form the cores of solenoids $E^5$ $E^6$, which are mounted upon the upright B. These solenoids are wound in such a manner as to pull in opposite directions, so as to rotate the pinion $E^2$ to swing the lamp in altitude, the lamp being mounted upon a pivot $E^7$, which enters a base $E^8$ and has a pinion $E^{10}$ gearing with a system of racks $E^{11}$, which enter solenoids $E^9$, the whole being arranged in a manner similar to the solenoids $E^5$ $E^6$ and their cores and the pinion $E^2$, and operating in a similar manner to swing the lamp in azimuth.

Referring again to Fig. 4, it will be noted that the wire 3 is connected to a switch 16 of the rheostat type, having switch-points 17 18 19 20 21 22 23, and that the solenoids $E^5$ and $E^6$ are connected by a common return-wire 24 with the wire 1. These solenoids are wound in sections and the sections connected in series, the beginning of the sections in the solenoid $E^6$ being connected by wires 25 26 27 28 29 30 31 with the switch-points 17, 18, 19, 20, 21, 22, and 23, respectively, the beginning of the sections of the solenoid $E^5$ being connected by wires 32 33 34 35 36 37 38 with the wires 25 26 27 28 29 30, so that by shifting the switch 16 from point to point (17 to 23) coils of one solenoid will be cut into circuit as the coils of the other solenoid are cut out of the circuit, so that there will be at all times a constant number of coils in circuit, and the action on the pinion will be distributed between the solenoids. The solenoids $E^9$ $E^9$ are similarly wound and connected to the switch 39, which is in turn connected by the wire 40 with the positive wire 3, the solenoids having also a common return-wire 41, leading to the negative terminal, the operations being in all respects similar to those of solenoids $E^5$ and $E^6$.

It will be observed that I have produced a device which may be swung from a distance and whose light-modifying media may be controlled or operated from a distance, so that several of these devices may be operated from one place.

I am aware that it is not broadly new to provide screens in the path of projectors, as the same have been heretofore used both with electric and lime light projectors, but, as I have stated, they are unsatisfactory for a variety of reasons. I therefore do not desire to be understood as claiming this subject-matter broadly, but I would have it understood that various apparatuses may be used without departing from the spirit of my invention.

What I claim, and desire to secure by Letters Patent, is—

1. A theatrical-display apparatus comprising a projector having a reflector, means for swinging the projector in altitude and azimuth, and a plurality of movable screens for modifying the beam of light carried by and moving with the swinging projector, and electromagnets moving with the projector and connected to the said screens for operating the same independently of each other.

2. In an apparatus for producing light effects, the combination of a projector having a reflector, a plurality of screens carried by the reflector and electromagnetic means for bringing the screens into the path of the light from the projector, the said electromagnetic means operating independently of the illuminating apparatus for the projector, as and for the purposes set forth.

3. In an apparatus for producing theatrical light effects, the combination of a reflector, a series of screen-sections pivoted thereon, and electromagnetic means for actuating the screen-sections to move the same in the beam of light, the said electromagnetic means being independent of the illuminating apparatus for the reflector.

4. An apparatus for producing light effects in theaters comprising the following instrumentalities in operative relation, to wit: a lamp suitable for projecting an illuminating beam of light upon a stage, a series of different-colored screens movable into the path of the beam, a series of electromagnets for interposing the screens individually in the path of the beam of light, and individual controlling mechanism for controlling the electromagnets individually from a common location and electromagnetic means for swinging the lamp controlled from a distance.

5. The combination of a light-screen comprising pivoted sections, connections between the sections and a pivotally-supported solenoid, and a core entering the solenoid and connected with one or more of the screen-sections.

6. The combination of a lamp, a pivoted support therefor, a pinion, a pair of solenoids having toothed cores which mesh with the pinion, and means for energizing one or the other of the solenoids, whereby the lamp will be swung.

7. The herein-described swinging device comprising a pinion, racks gearing therewith, armatures for controlling the movement of the racks, and magnets for moving the armatures, the said magnets comprising a plurality of coils connected in series, the terminals of the series being connected to one pole of a source of electricity, and each section being individually connected to a rheostat-switch so that movement of the switch will cut in the coils of one magnet and cut out the coils of the other magnet *seriatim*, substantially as described.

8. The herein-described light-effects exhibitor comprising a lamp, individually and independently controllable electromagnetic means for interposing different light-effects media in the beam of light of the lamp, individually and independently controllable electromagnetic means for swinging the lamp in altitude, and individually and independently controllable electromagnetic means for swinging the lamp in azimuth, the said swinging means being controlled from a common point, and means for so controlling them.

9. The herein-described circuit arrangement comprising armatures, magnets for moving the armatures, the said magnets comprising a plurality of coils connected in series, the terminals of the series being connected to one pole of a source of electricity, a rheostat-switch, each section being individually connected to the rheostat-switch so that movement of the switch will cut in the coils of one magnet and cut out the coils of another magnet *seriatim*, substantially as described.

HARRY V. ARNOLD.

Witnesses:
MAURICE BLOCK,
CHARLES E. SMITH,
GEO. E. MORSE.